United States Patent [19]

Marfurt et al.

[11] 4,439,290

[45] Mar. 27, 1984

[54] PROCESS FOR THE SEPARATION OF OIL-IN-WATER EMULSIONS BY ELECTROLYSIS

[75] Inventors: Hans-Rudolf Marfurt; August Zürer, both of Marly, Switzerland

[73] Assignee: Ciba-Geigy Corporation, Ardsley, N.Y.

[21] Appl. No.: 267,310

[22] Filed: May 28, 1981

[30] Foreign Application Priority Data

Jun. 4, 1980 [CH] Switzerland .......................... 4333/80

[51] Int. Cl.³ ............................................. C02F 1/46
[52] U.S. Cl. .................................................. 204/149
[58] Field of Search ......................................... 204/149

[56] References Cited

U.S. PATENT DOCUMENTS 3,783,114  1/1974  Ishii ..................................... 204/149
4,194,972  3/1980  Weintraub ........................... 204/149
4,271,028  6/1981  Marfurt et al. ....................... 210/727

FOREIGN PATENT DOCUMENTS 1463022  2/1977  United Kingdom ................ 204/149

Primary Examiner—T. M. Tufariello
Attorney, Agent, or Firm—Edward McC. Roberts

[57] ABSTRACT

Process for the continuous separation of oil-in-water emulsions, which may contain surfactants, for example oil- and surfactant-containing effluents, by electrolysis, which comprises electrolysing such emulsions at a pH value of 5 to 10 and under a potential difference of at least 1.5 volts between the electrodes, optionally in the presence of a coagulating agent, with the formation of discrete oil particles, floating these oil particles with the aid of hydrogen gas formed simultaneously at the cathode, and then separating off the oily phase thus formed which is optionally condensed by the addition of flocculating agents.

14 Claims, 1 Drawing Figure

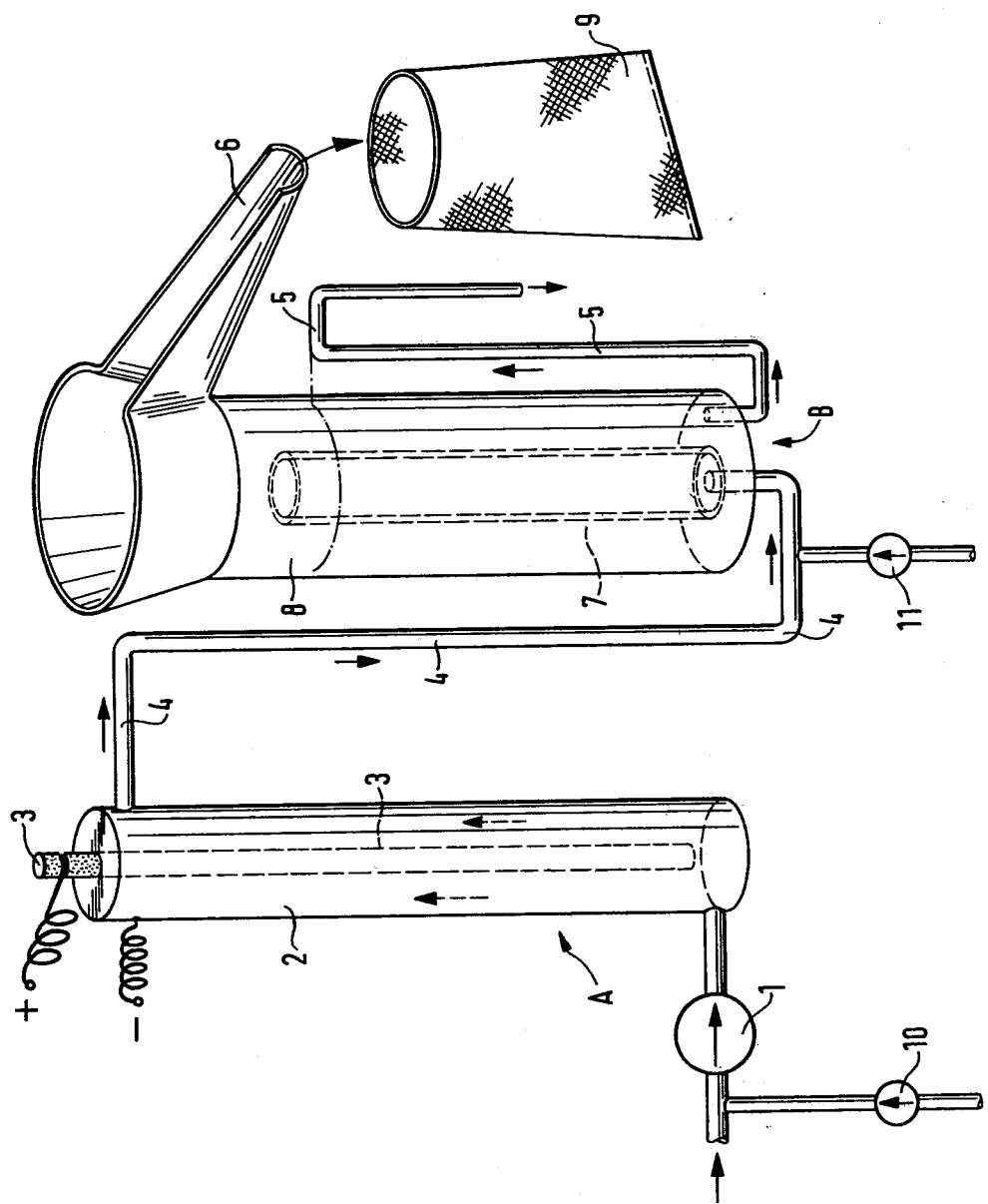

PROCESS FOR THE SEPARATION OF OIL-IN-WATER EMULSIONS BY ELECTROLYSIS

The present invention relates to the separation of oil-in-water emulsions, which may contain surfactants, by electrolysis. This separation is especially suitable for the purification of effluents which contain oil or oil and surface-active assistants (surfactants). Such effluents are obtained, for example, in car repair workshops, and other mechanical workshops, in car wash and engine wash units, for example car or aeroplane engine wash units, and also in machine factories and steelworks, but can also be domestic sewage.

It is known to separate oil-in-water emulsions which do not contain emulsifying additives by treatment with, for example, active charcoal, i.e. to adsorb the oil onto the charcoal. However, this process requires additional and expensive separating operations in order to guarantee the purification of the water.

Oil-in-water emulsions which do contain emulsifying additives cannot be separated by an adsorption method.

The object of the present invention is therefore to provide a separating process (process for the purification of water (effluent)), for the two indicated types of oil-in-water emulsions, which on the one hand has a high efficiency and on the other hand can be carried out using simple means.

It has now been found that the above object can be achieved by means of the electrolysis process described below.

The subject of the present invention is therefore a process for the continuous separation of oil-in-water emulsions, which may contain surfactants, by electrolysis, which comprises electrolysing such emulsions at a pH value of 5 to 10 and under a potential difference of at least 1.5 volts between the electrodes, optionally after the addition of a coagulating agent, with the formation of discrete oil particles, floating these oil particles with the aid of hydrogen gas formed simultaneously at the cathode, and then separating off the oily phase thus formed, which optionally can also be condensed by the addition of flocculating agents.

The process can thus be carried out without using a coagulating agent and either without adding flocculating agents or in the presence of the latter. On the other hand, it is possible to use a coagulating agent and either to dispense with or to employ the flocculating agent. The last alternative is preferred, i.e. the use of a coagulating agent in the electrolysis and the addition of a flocculating agent in order to condense the oil phase.

Further subjects of the present invention are the device (electrolysis cell or several electrolysis cells connected in series) for carrying out the process, which device is combined with a special flotation separator (flotation decanter), and also the application of the process according to the invention to the purification of process water and effluent.

The emulsions which are separated according to the invention should have pH values in the range from 5 to 10, preferably in the range from 6 to 8. The pH value can be adjusted within the indicated range by adding customary bases, for example alkali metal hydroxides, such as especially sodium hydroxide or potassium hydroxide, or acids, for example inorganic acids (sulfuric or hydrochloric acid) or low-molecular organic acids (acetic acid or formic acid). The said bases and acids are employed as a rule in the form of dilute aqueous solutions.

If necessary—for example if the voltage to be overcome between anode and cathode is too large—further electrolytes, especially inorganic salts (sodium chloride), can also be added to the emulsions in order to improve the conductivity.

Examples of the oil (hydrocarbons) which can be present in the emulsions to be separated are benzine, light and heavy heating oils, cutting oils or lubricating oils, which can also contain conventional additives. Thus, for example, cutting oils additionally contain emulsifiers.

The surfactants which can be present in the oil-containing effluents (oil-in-water emulsions) are those which are employed in commercially available detergents (washing powders, washing pastes and cold-cleaning agents). They are as a rule non-ionic or anionic compounds; however, they can also be cationic, amphoteric or zwitterionic.

Possible non-ionic surfactants are, in particular, polyglycol ether derivatives of aliphatic or cycloaliphatic alcohols, of saturated or unsaturated fatty acids and of alkylphenols, which can contain about 3 to 30 glycol ether groups and 8 to 20 carbon atoms in the (aliphatic) hydrocarbon radical and about 6 to 18 carbon atoms in the alkyl radical or alkylphenol. Preferred polyglycol ether derivatives are those in which there are 5 to 25 ethylene glycol ether groups and of which the hydrocarbon radicals are derived from linear primary alcohols having 12 to 18 carbon atoms or from alkylphenols having a linear alkyl chain containing 6 to 14 carbon atoms. Optionally the last-mentioned polyethylene glycol ethers are further modified by the formation of an adduct with propylene oxide, for example 3 to 25 mols.

Further non-ionic surfactants are water-soluble polyethylene oxide adducts, containing 20 to 250 ethylene glycol ether groups and 10 to 100 propylene glycol ether groups, with polypropylene glycol, ethylenediamino-polypropylene glycol and alkylpolypropylene glycol having 1 to 10 carbon atoms in the alkyl chain. The said compounds usually contain 1 to 5 ethylene glycol units per polyglycol unit. Non-ionic compounds of the type comprising long-chain optionally ethoxyleted amine oxides and sulfoxides are also used.

Examples of anionic surfactants are those of the sulfonate or sulfate type, such as alkylbenzenesulfonates having, for example, 6 to 18 carbon atoms in the alkyl part, especially n-dodecylbenzenesulfonate, and olefinsulfonates, such as those obtained, for example, by the sulfonation of primary or secondary aliphatic monoolefins with gaseous sulfur trioxide and subsequent alkaline or acid hydrolysis, and also alkylsulfonates preferably having, for example, 10 to 24 carbon atoms, such as those obtainable from n-alkanes by sulfochlorination or sulfoxidation and subsequent hydrolysis or neutralisation, or by bisulfite addition onto olefins. $\alpha$-Sulfo fatty acid esters and primary and secondary alkyl-sulfates of high-molecular alcohols are also used. Further compounds in this class are the high-molecular sulfated partial ethers and esters of polyhydric alcohols, for example their alkali metal salts, or monoalkyl ethers or mono fatty acid esters of glycerol monosulfate or of 1,2-dioxypropanesulfonic acid. Sulfates of ethoxylated and/or propoxylated fatty acid amides and alkylphenols, and fatty acid taurides, can also be present. Further surfactants are the sulfonated benzimidazole derivatives and also alkali metal soaps of fatty acids of natural or synthetic origin, for example the sodium soaps of coconut fatty acid, palm-kernel acid or tallow fatty acid.

Examples of amphoteric surfactants are derivatives of aliphatic secondary and tertiary amines or aliphatic derivatives of heterocyclic secondary and tertiary amines, in which the aliphatic radicals can be linear or branched and in which one of the aliphatic radicals contains about 8 to 18 carbon atoms and at least one aliphatic radical carries an anionic group which confers solubility in water.

Examples of zwitterionic surfactants are derivatives of aliphatic quaternary ammonium, phosphonium and sulfonium compounds in which the aliphatic radicals can be linear or branched, one of the aliphatic radicals contains about 8 to 18 carbon atoms and one of these groups carries an anionic group which confers solubility in water.

Examples of such surfactants are alkylbetaines and especially alkylsulfobetaines such as 3-(N,N-dimethyl-N-alkylammonium)-propane-1-sulfonate and 3-(N,N-dimethyl-N-alkylammonium)-2-hydroxypropane-1-sulfonate.

Examples of cationic surfactants are ammonium salts having at least one long-chain radical which as a rule is derived from a fatty acid, such as distearyldimethylammonium chloride, stearyldimethylbenzylammonium chloride, (coconut alkyl)-dimethylbenzylammonium chloride, di-(coconut alkyl)-dimethylammonium chloride, cetylpyridinium chloride and cetyltrimethylammonium bromide.

The anionic surfactants can be present in the form of sodium salts, potassium salts and ammonium salts and also as salts of organic bases such as mono-, di- and tri-ethanolamine. If the said anionic and zwitterionic compounds possess an aliphatic hydrocarbon radical, this is preferably linear and can have 8 to 26, especially 8 to 22, carbon atoms. In the compounds having an araliphatic hydrocarbon radical, the preferably unbranched alkyl chains contain an average of about 6 to 18 carbon atoms.

Possible coagulating agents which can be added, before the electrolysis, to the aqueous emulsions to be purified, and which are used, for example, in an amount of 0.02 to 0.3 g/liter, are polymeric compounds, for example based on cellulose, such as carboxymethylcellulose or methylcellulose; alginates (alkali metal salts of alginic acid); gelatin and gelatin derivatives (graft copolymers of ethylenically unsaturated monomers and gelatin); bean flour formulations (galactomannans), for example carob bean flour formulations, especially partially etherified products, or optionally also polymeric aluminium chloride.

Examples of suitable flocculating agents which can be optionally employed in the process according to the invention, in order to facilitate the separation of the oil phase, are reaction products of dicyanodiamide, amine salts (especially ammonium chloride) and formaldehyde in a molar ratio of 1:1:2, such as those known from Swiss Patent Specification No. 471,803. Other amines which, in the form of their amine salts, are suitable for the preparation of the reaction products are aliphatic, cycloaliphatic, aromatic and heterocyclic monoamines, for example methylamine, ethylamine, ethanolamine, allylamine, n-propylamine, n-butylamine, isobutylamine, amylamine, stearylamine, oleylamine, cyclohexylamine, aniline, p-aminophenol, aminopyrimidine or aminopyridine. The salts can be derived from organic acids, such as formic acid or acetic acid, or preferably from strong mineral acids, such as hydrochloric acid or sulfuric acid.

Examples of another suitable group of flocculating agents are condensates of dicyanodiamide or dicyanodiamidine and optionally urea, formaldehyde and optionally an alkylenepolyamine having 2 to 8 carbon atoms.

Examples of the alkylenepolyamines are tetraethylenepentamine, triethylenetetramine, diethylenetriamine, ethylenediamine, propylenediamine or butylenediamine.

Suitable products are, in particular, formaldehyde/dicyanodiamide/ethylenediamine or dicyanodiamide/formaldehyde or formaldehyde/urea/dicyanodiamide condensates. Preferred products are obtained, for example, by condensing 2 mols of formaldehyde with 1 mol of the reaction product of 2 mols of dicyanodiamide and 1 mol of ethylenediamine or the appropriate salt with an acid, such as the hydrochloride. Other equally preferred products are prepared by condensing in each case 1 mol of urea, dicyanodiamide and formaldehyde in the presence of an acid, such as hydrochloric acid, or by condensing 1 mol of dicyanodiamide with 2 mols of formaldehyde.

Other advantageous products are obtained by condensing 3 to 4 mols of dicyanodiamide with 7 mols of formaldehyde and 1 mol of the tetrahydrochloride of triethylenetetramine.

Further flocculating agents which can also be used are metal salts of polyvalent metals, for example aluminium salts, of fatty acids having 12 to 18, especially 16 to 18, carbon atoms. These metal salts are normally present in emulsified form. Optionally these emulsions can contain paraffin oil and organic solvents. Polymeric aluminium chloride is also suitable. Further suitable flocculating agents are polymers based on, for example, (meth)acrylic acid/(meth)acrylamide, which polymers can be cationic, anionic or neutral. The molecular weights of these polymers are approximately in the range from $10^5$ to $10^9$. Examples of cationic representatives are copolymers of (meth)acryloxyalkylene($C_1$-$C_4$)-trialkyl($C_1$-$C_2$)-ammonium salts (halides and methosulfates) and (meth)acrylamide, and optionally also other ethylenically unsaturated comonomers (acrylonitrile), such as the copolymer of 90 mol % of methacryloxyethylenetrimethylammonium chloride and 10 mol % of acrylamide, having a molecular weight of about $6.10^6$.

Typical anionic representatives are (meth)acrylic acid (or alkali metal salts thereof)/(meth)acrylamide copolymers or copolymers of these monomers and other ethylenically unsaturated comonomers (acrylonitrile), for example copolymers of 35 mol % of methacrylic acid and 65 mol % of acrylamide (MW: $1.5.10^7$) or of 10 mol % of (meth)acrylic acid and 90 mol % of acrylamide (MW: $0.5$-$1.10^7$). Polyacrylamides having molecular weights of between $10^6$ and $10^8$ are suitable non-ionic flocculating agents.

The flocculating agents used according to the invention can also be employed in combination with other flocculating agents.

The amount of flocculating agent (calculated as active substance) per liter of oil-in-water emulsion is about 0.1 to 100 mg/liter, especially 0.1 to 50 and preferably 0.1 to 10 mg/liter.

Typical amounts used can be between 1 and 50 mg/liter.

The flocculating agents are as a rule added to the emulsions to be separated (effluents to be purified) after the electrolysis has ended, in order to condense the oil phase and to facilitate separation.

The device for carrying out the process according to the invention is illustrated in more detail with the aid of the FIGURE.

A feed pump (1) drives the emulsion-containing effluent through an electrolysis cell (A) from bottom to top. The cell consists of an outer metal casing (2), connected as the cathode, and a rod-shaped sacrificial or inert anode (3) inserted concentrically in the casing tube. On passing through the electrolysis cell, the emulsion is broken on the anode side under the action of the metal going into solution. Metal hydroxide forms in this process and adsorbs the oil droplets released from the emulsion. Hydrogen is liberated on the cathode side and accumulates on the metal hydroxide/oil flocks and thereby causes the latter to float. Thus, a two-phase mixture, consisting on the one hand of floatable oil slurry and on the other hand of the de-oiled effluent, leaves the electrolysis cell. This mixture is conveyed (4) to the flotation decanter (B) in such a way that it first flows through an inner tube (7), which is located concentrically in a second, outer tube (8). In this outer tube, a water level is established at the height of the levelling tube (5). Driven by the hydrogen, the slurry flows to the water surface, builds up at the surface, loses part of its water in the process, overflows automatically into the inclined flange-shaped spout (6) and is collected in a slurry-draining bag (9) made of porous fabric (jute), where it drains until compact. The clarified effluent released from the slurry leaves the system via the levelling tube (5).

Depending on the nature of the effluents to be treated, coagulating assistants and flocking assistants or flotation assistants, which as a rule have an advantageous influence on the formation of flocks, can be fed in via the metering pumps (10) and (11).

This device can be modified in various ways. Thus, for example, the metal casing (2) connected as the cathode can be in the form of a rectangular vessel and the anode (3) can be in the form of a plate, or the metering pump (10) can be installed downstream of the feed pump (1).

By connecting two or more such electrolysis cells in series, the separation effect can be improved, especially if the anode materials in the two cells are different from one another (for example replacement of an aluminium anode by an iron anode). The separation of the oil slurry can be carried out after each electrolysis step or only once after the electrolysis has ended.

The electrode material for carrying out the electrolysis consists of customary materials suitable for this purpose. Thus, the anode, which can be in the form of an inert or sacrificial anode, consists, for example, of graphite, iodine or platinum (inert anode), iron, zinc or aluminium, whilst the cathode as a rule consists of graphite, iron, brass or copper.

Preference is given to inert anodes of graphite and sacrificial anodes of iron or aluminium; particularly suitable cathodes are those of graphite or iron.

The conditions for carrying out the electrolysis depend on the nature of the emulsions and also on the electrode material. In general, however, the electrolysis is carried out under a potential difference of 1.5 or 1.8 to 20 volts between the electrodes and with a current strength of 10 to 100 mA per $cm^2$ of electrode surface area.

The distance between the electrodes is about 0.5 to 2.5 cm, preferably 1.5 cm.

Flow rates of about 2 to 20 liters/hour are possible in electrolysis cells in which the cathode is a tube with a length of about 80 cm and a diameter of 2.5 to 3 cm and the anode has a diameter of about 1 to 2 cm and a length of about 100 cm. The applied direct-current voltage is about 15 volts and the current strength is about 10 amperes.

Flow rates of about 1,000 to 10,000 liters/hour are possible if the electrolysis cells have the following dimensions: cathode—length: about 150 cm, diameter: about 8 cm; anode—length: 170 cm, diameter: about 6 cm.

If the anode is employed as a sacrificial anode, this goes into solution as metal hydroxide and the zeta-potential of the disperse solution tends towards zero. The emulsion is broken in this process. At voltages above 1.5 volts, for example at 1.8 or 2 volts, hydrogen is formed at the cathode, accumulates on the oil slurry formed and causes it to float. The flotation can be improved and the possible deposition of electrolysis products on the surface of the electrode can be prevented if air is blown into the electrolysis vessel during the electrolysis.

After leaving the electrolyser, the effluent consists of a two-phase mixture of the aqueous de-oiled solution, on the one hand, and the agglomerate of very fine, oil-containing slurry flocks (optionally stabilised by coagulating agents), on the other hand. The latter can be condensed to form large flocks by adding suitable flocculating assistants.

The resulting oil flocks can be separated off without difficulty in a flotation decanter (B).

Determination of the oil content present in the effluent, before and after the electrolysis, can be carried out as follows.

The sample to be determined is extracted with chloroform and the residue is concentrated to the necessary extent.

In the infra-red spectrum, an absorption maximum typical of aliphatic oils can be measured at a wavenumber of 2,935 $cm^{-1}$ and its extinction value is proportional to the oil content with an adequate degree of accuracy.

Another method of determination uses carbon tetrachloride to extract the samples. The oil content is determined by measuring the infra-red absorption of the resulting solutions at 3,400–3,500 nm.

The process according to the invention is suitable, for example, for the separation of oil-in-water emulsions which contain 10 to 50,000 ppm, for example 10 to 20,000 ppm (or 10 to 2,000 ppm or 50 to 1,000 ppm) of oil or oily substances and 100 to 5,000 ppm of a surfactant.

The efficiency of the process is excellent, it being possible simultaneously to remove oil (oil-containing substances) and surfactants from water (effluents) and, for example, to reduce the oil content to values below 1 ppm.

The invention is illustrated in more detail in the following examples.

EXAMPLES

Example 1

100 liters of an oil emulsion which contains 50 ppm of heating oil and 100 ppm of a surfactant mixture of nonionic and anionic surfactants, and which is adjusted to a pH value of 8 by the addition of aqueous sodium hydroxide/sodium chloride solution, is pumped through an electrolysis cell according to the FIGURE (flow rate: 4.3 liters/hour), the cathode of which consists of an iron tube with a length of 1 m and an internal diameter of 4 cm. An iron rod with a length of 95 cm and a diameter of 2 cm is used as the anode. This anode is inserted concentrically in the iron tube and is insulated therefrom. The emulsion to be separated is pumped through the electrolysis cell from bottom to top. A direct current of 20 mA/cm$^2$ is applied to the cell; the corresponding voltage is 3 volts. The solution leaving the cell consists of a two-phase mixture, namely the clarified effluent, on the one hand, and oil slurry floating thereon, on the other hand. The clarified effluent has a residual oil content of less than 1 ppm. The oil slurry is decanted. It still has a water content of 95%.

EXAMPLE 2

(a) 10 liters of cutting oil, which is prepared from 0.5 liter of commercially available concentrate and 9.5 liters of water, is brought to a pH value of 7 with sulfuric acid and then pumped at a rate of 4 liters/hour through the electrolysis apparatus described in Example 1. The anode consists of an aluminium rod. The direct current applied to the electrodes is 80 mA/cm$^2$, the voltage being about 10 volts. An absolutely clear, slightly greenish-coloured effluent with a residual oil content of less than 10 ppm leaves the cell. A thick oil slurry floats on the clarified effluent and is decanted.

(b) After passage through the first electrolysis cell, the cutting oil mentioned under (a) is pumped through a second cell, the anode of which consists of iron and to which a direct current of 10 mA/cm$^2$ and a voltage of 8 volts are applied. An effluent having an oil content of less than 2 ppm is obtained. The oil slurry is decanted again.

EXAMPLE 3

The oil emulsion according to Example 1 is electrolysed, under the conditions indicated in Example 1, in an electrolysis cell which contains an aluminium rod as the anode. The flow rate is 2.3 liters/hour. The clarified effluent has a residual oil content of less than 10 ppm. The oil slurry is decanted.

EXAMPLE 4

An oil emulsion containing 200 ppm of heating oil is electrolysed, under the following conditions, in an electrolysis cell which contains an aluminium rod as the anode (but is otherwise identical to that in Example 1):

Current strength: 40 mA/cm$^2$
Voltage: 16.5 volts
pH value: 6.0
Flow rate: 6 liters/hour.

1 g/liter of a flocculating agent (condensate of dicyanodiamide, ammonium chloride and formaldehyde) is added to the oil emulsion in order to improve the separation of the oil. The clarified effluent has a residual oil content of less than 25 ppm. The oil slurry condensed by means of the flocculating agent is decanted.

EXAMPLE 5

An oil emulsion containing 30,000 ppm of cutting oil is brought to a pH value of 6.6 with sulfuric acid and treated with coagulating agent (0.14 g of the sodium salt of carboxymethylcellulose and 0.055 g of a condensate of dicyanodiamide, ammonium chloride and formaldehyde in a molar ratio of 1:1:2, per liter of emulsion) and with sodium chloride (1.5 g per liter of emulsion). The emulsion is then pumped through an electrolysis cell according to the FIGURE (flow rate: 50 liters/hour), the cathode of which consists of a steel tube with a length of 120 cm and an internal diameter of 5 cm. An aluminium rod with a length of 125 cm and a diameter of 4 cm is used as the anode. A pulsating direct current of 26 A/7 V is applied to the electrodes. 0.26 g of a polymeric aluminium chloride (content: 15%, determined as Al$_2$O$_5$) is metered in, per liter of emulsion, in order to improve the separation of the flocks formed in the electrolyser. The purified water with a residual oil content of 15 ppm (carbon tetrachloride extract, determined by photometry) flows out at the outlet of the decanter.

Sodium alginates, gelatin or bean flour ether can also be used as coagulating agents.

EXAMPLE 6

The procedure of Example 5 is followed, 0.14 g/liter of a partially etherified carob bean flour being used as the coagulating agent and 0.19 g/liter of a copolymer of 90 mol % of methacryloxyethylenetrimethylammonium chloride and 10 mol % of acrylamide (MW: 6.10$^6$) being used as the flocculating agent. The residual oil content is 18 ppm.

EXAMPLE 7

The procedure of Example 5 is followed, the oil-in-water emulsion to be separated consisting of an effluent from the car industry (10,000 ppm of mineral oils and surfactants), which has been adjusted to a pH value of 7 with sodium carbonate.

0.14 g of a partially etherified carob bean flour is used, per liter of emulsion, as the coagulating agent. 0.07 g of a copolymer of 90 mol % of acrylamide and 10 mol % of acrylic acid (MW: 10$^7$) is used, per liter of emulsion, as the flocculating agent. The residual oil content is 14 ppm.

EXAMPLE 8

An oil emulsion containing 10,000 ppm of cutting oil is brought to a pH value of 6.6 with sulfuric acid and treated with coagulating agent (0.024 g of the sodium salt of carboxymethylcellulose per liter of emulsion) and with sodium chloride (2.5 g per liter of emulsion). The emulsion is then pumped, as described in Example 5 (flow rate: 100 liters/hour), through 2 electrolysis cells (A) according to the FIGURE, which are connected in series. A pulsating direct current of 30 A/8 V is applied to the electrodes. 903 g of a copolymer of 90 mol % of methacryloxyethylenetrimethylammonium chloride and 10 mol % of acrylamide (MW: 6.10$^6$) are then metered in, per liter of emulsion, in order to improve the separation of the flocks formed. The purified water has a residual oil content of 20 ppm (carbon tetrachloride extract, determined by photometry).

What is claimed is:

1. A process for the continuous separation of an oil-in-water emulsion, comprising the steps of adding a coagulating agent thereto, electrolyzing said emulsion at a pH value of 5 to 10, under a potential of at least 1.5 volts to form discrete oil particles, floating these oil particles with the aid of hydrogen gas formed simultaneously at the cathode, separating off the oil phase thus formed, and adding a flocculating agent to condense the oil phase.

2. The process of claim 1, wherein the emulsion contains a surfactant.

3. The process of claim 1, wherein the pH value of the emulsion is 6 to 8.

4. The process of claim 1, wherein the potential is 1.5 to 20 volts.

5. The process of claim 1, wherein the anode is an inert or sacrificial anode consisting of graphite, iron or aluminium.

6. The process of claim 1, wherein the cathode consists of graphite or iron.

7. The process of claim 1, wherein the current strength is 10 to 100 mA per $cm^2$ of electrode surface area.

8. The process of claim 1, wherein the continuous electrolysis is carried out in steps in at least two electrolysis cells connected in series, the separation of the oil phase being carried out after each electrolysis step or once after the electrolysis has ended.

9. The process of either of claims 1 or 3, wherein the coagulating agent is selected from the group consisting of cellulosic compounds, alginates, gelatin, gelatin derivatives, carob bean flour formulations and polymeric aluminium chloride.

10. The process of claim 1, wherein the flocculating agent is a reaction product of dicyandiamide, an amine salt and formaldehyde.

11. The process of claim 1, wherein the flocculating agent is a polymer based on (meth)acrylic acid/(meth)acrylamide, having a molecular weight in the range of $10^5$ to $10^9$.

12. The process of claim 1, wherein the oil phase is separated by means of a flotation decanter.

13. The process of claim 3 wherein the oil-in-water emulsion contains 10 to 50,000 ppm of oil and 100 to 5,000 ppm of a surfactant.

14. The process of claim 13, wherein the oil-in-water emulsion is an effluent.

* * * * *